(12) United States Patent
Hara et al.

(10) Patent No.: US 11,437,163 B2
(45) Date of Patent: Sep. 6, 2022

(54) INSULATED WIRE, COIL, AND ELECTRICAL OR ELECTRONIC EQUIPMENT

(71) Applicant: ESSEX FURUKAWA MAGNET WIRE JAPAN CO., LTD., Tokyo (JP)

(72) Inventors: Natsuko Hara, Tokyo (JP); Keiichi Tomizawa, Tokyo (JP); Hideo Fukuda, Tokyo (JP)

(73) Assignee: ESSEX FURUKAWA MAGNET WIRE JAPAN CO., LTD., Tokyo (JP)

( * ) Notice: Subject to any disclaimer, the term of this patent is extended or adjusted under 35 U.S.C. 154(b) by 16 days.

(21) Appl. No.: 17/037,013

(22) Filed: Sep. 29, 2020

(65) Prior Publication Data
US 2021/0012922 A1 Jan. 14, 2021

Related U.S. Application Data

(63) Continuation of application No. PCT/JP2020/011210, filed on Mar. 13, 2020.

(30) Foreign Application Priority Data

Mar. 29, 2019 (JP) .............................. JP2019-066644

(51) Int. Cl.
*H01B 3/30* (2006.01)
*C08G 73/10* (2006.01)
*C09D 179/08* (2006.01)

(52) U.S. Cl.
CPC .......... *H01B 3/306* (2013.01); *C08G 73/1042* (2013.01); *C08G 73/1071* (2013.01); *C09D 179/08* (2013.01)

(58) Field of Classification Search
CPC ........ H01B 3/306; H01B 3/30; C09D 179/08; B32B 15/088; C08G 73/1042; C08G 73/1071; H01F 27/2823
See application file for complete search history.

(56) References Cited

U.S. PATENT DOCUMENTS

2009/0176961 A1  7/2009  Kikuchi et al.
2010/0059248 A1  3/2010  Honda et al.
(Continued)

FOREIGN PATENT DOCUMENTS

JP  2009-161683 A  7/2009
JP  2010-67408 A  3/2010
(Continued)

OTHER PUBLICATIONS

English translation of the International Search Report, dated Jun. 2, 2020, for International Application No. PCT/JP2020/011210.

*Primary Examiner* — John D Freeman
(74) *Attorney, Agent, or Firm* — Birch, Stewart, Kolasch & Birch, LLP

(57) ABSTRACT

An insulated wire, containing a conductor and an insulating film provided in contact with the conductor, in which the insulating film provided in contact with the conductor contains a polyimide resin, and the polyimide resin contains a constituting unit (A) derived from 2,2-bis[4-(4-aminophenoxy)phenyl]propane and a constituting unit (B) derived from 9,9-bis(4-aminophenyl)fluorene as a diamine-derived constituting unit; the polyimide resin has an imide group concentration of 25.0% or less; and the ratio of the content of the constituting unit (B) occupied in the diamine-derived constituting unit in the polyimide resin is 1 to 40 mol %.

7 Claims, 1 Drawing Sheet

(56) References Cited

U.S. PATENT DOCUMENTS

| | | | | |
|---|---|---|---|---|
| 2013/0000951 A1* | 1/2013 | Honda | ................... | H01B 3/306 174/120 SR |
| 2013/0032374 A1* | 2/2013 | Ushiwata | ............. | C09D 179/08 174/110 N |
| 2018/0286532 A1 | 10/2018 | Oya | | |

FOREIGN PATENT DOCUMENTS

| | | | |
|---|---|---|---|
| JP | 2012-184311 | A | 9/2012 |
| JP | 2012-233123 | A | 11/2012 |
| JP | 2017-95594 | A | 6/2017 |
| WO | WO 2017/098993 | A1 | 6/2017 |

* cited by examiner

INSULATED WIRE, COIL, AND ELECTRICAL OR ELECTRONIC EQUIPMENT

CROSS-REFERENCE TO RELATED APPLICATIONS

This application is a Continuation of PCT International Application No. PCT/JP2020/011210 filed on Mar. 13, 2020, which claims priority under 35 U.S.C. § 119 (a) to Japanese Patent Application No. 2019-066644 filed in Japan on Mar. 29, 2019. Each of the above applications is hereby expressly incorporated by reference, in its entirely, into the present application.

TECHNICAL FIELD

The present invention relates to an insulated wire, a coil, and an electrical or electronic equipment.

BACKGROUND ART

In an inverter-related equipment (such as coils for electrical or electronic equipment, including high-speed switching devices, inverter motors, transformers, and the like), an insulated wire (enamel wire), in which an insulating resin covering layer (insulating film or insulating layer) is formed on the periphery of a conductor, is used as a magnet wire. A polyimide resin is used as a constituent material of the insulating film of the insulated wire (for example, see Patent Literatures 1 to 3). Further, since a voltage almost twice as high as the inverter output voltage is applied to in the inverter-related equipment, it becomes required in insulated wires for used in the equipment to have minimized partial discharge deterioration due to the inverter surge.

In order to prevent the deterioration of the insulated wire due to such partial discharge, it is required that the insulating film be made of a material with a low relative permittivity.

CITATION LIST

Patent Literatures

Patent Literature 1: JP-A-2010-67408 ("JP-A" means unexamined published Japanese patent application)
Patent Literature 2: JP-A-2012-233123
Patent Literature 3: JP-A-2017-095594

SUMMARY OF INVENTION

Technical Problem

There is approximately correlation between the relative permittivity and the content of polar groups of the insulating film formed by a polyimide resin. From this view point, it is thinkable to suppress the relative permittivity of the insulating film by forming the insulating film using a polyimide resin in which the content of imide groups is reduced. However, when the content of imide groups in the polyimide resin that constitutes the insulating film is low, in a case where the insulating film is provided in contact with a conductor, it is not possible to sufficiently increase the adhesion force to the conductor.

If the adhesion force between the insulating film and the conductor is not sufficient, for example, when a wire is subject to a processing such as bending and stretch, peeling easily occurs between the insulating film and the conductor. If a void occurs between the conductor and the insulating film by this peeling, the electric field concentrates there and dielectric breakdown occurs, or the stress concentrates there and the insulating film tends to easily break.

In this way, suppression of the relative permittivity of the insulating film and improvement of adhesion between the insulating film and the conductor has a so-called trade-off relationship. It is difficult to achieve both characteristics at a high level by using a polyimide resin. In a case of using a polyimide resin having a low relative permittivity for the insulating film, in view of the above, placement of the polyimide resin layer on the outer periphery of the conductor through an adhesion layer is under consideration.

In recent years, with the spread of hybrid cars and electric vehicles, improvement of motor efficiency is required, and output improvement by high-voltage motor drive is also required. Due to this improvement in the output of the motor, the amount of heat generated increases, and the maximum temperature of the motor rises to around 150° C. Therefore, insulated wires that can maintain sufficient adhesion between the conductor and the insulating film even in more severe high temperature environment are required.

In view of the above, the present invention is contemplated to provide an insulated wire that contains a polyimide resin in an insulating film in contact with a conductor, in which a relative permittivity of the insulating film is suppressed sufficiently and adhesion between the insulating film and the conductor is excellent, and further that can maintain sufficient adhesion between the conductor and the insulating film even in more severe high temperature environment. Further, the present invention provides a coil using the insulated wire, and an electrical or electronic equipment using the coil.

Solution To Problem

As a result of repeated intensive investigations in consideration of the above-described problems, the present inventors found that the above-described problems can be solved by employing, as a constituent material of the insulating film in contact with the conductor, a polyimide resin synthesized by using specific amounts of 2,2-bis[4-(4-aminophenoxy) phenyl]propane and 9,9-bis(4-aminophenyl)fluorene as a diamine raw material. The present invention is based on these findings, and the present inventors further conducted investigation, thus completing the present invention.

The problems of the present invention were solved by the following means:

[1]

An insulated wire, containing:

a conductor; and an insulating film provided in contact with the conductor;

wherein the insulating film provided in contact with the conductor contains a polyimide resin, and the polyimide resin contains a constituting unit (A) derived from 2,2-bis[4-(4-aminophenoxy)phenyl]propane and a constituting unit (B) derived from 9,9-bis(4-aminophenyl)fluorene as a diamine-derived constituting unit;

wherein the polyimide resin has an imide group concentration of 25.0% or less; and wherein the ratio of the content of the constituting unit (B) occupied in the diamine-derived constituting unit in the polyimide resin is 1 to 40 mol %.

[2]

The insulated wire described in the item [1], wherein the polyimide resin contains at least one kind of the following (C) and (D) as a tetracarboxylic dianhydride-derived constituting unit:

(C) a constituting unit derived from pyromellitic anhydride; and (D) a constituting unit derived from 3,3',4,4'-biphenyltetracarboxylic dianhydride.

[3]

The insulated wire described in the item [1] or [2], having two or more insulating films, which are different from each other in terms of constituent material.

[4]

The insulated wire described in the item [3], wherein the other insulating film that is different in constituent material from the insulating film provided in contact with the conductor contains at least one kind of a polyamideimide resin, a polyimide resin, and a polyesterimide resin.

[5]

A coil, containing the insulated wire described in any one of the items [1] to [4].

[6]

An electrical or electronic equipment, having the coil described in the item [5].

[7]

The electrical or electronic equipment described in the item [6], which is a transformer.

In the description of the present invention, any numerical expressions in a style of " . . . to . . . " will be used to indicate a range including the lower and upper limits represented by the numerals given before and after "to", respectively.

Effects of Invention

The insulated wire of the present invention is excellent in adhesion between the conductor and the insulating film, even a polyimide resin having a low relative permittivity (low imide group concentration) is employed in the insulating film in contact with the conductor, and is also able to maintain the adhesion sufficiently even at a high temperature. Further, the coil of the present invention and the electrical or electronic equipment employing the coil, each of which has the insulated wire of the present invention, are excellent in durability.

MODE FOR CARRYING OUT THE INVENTION

Insulated Wire

Hereinafter, preferable embodiments of the insulated wire of the present invention are described.

Figure 1:
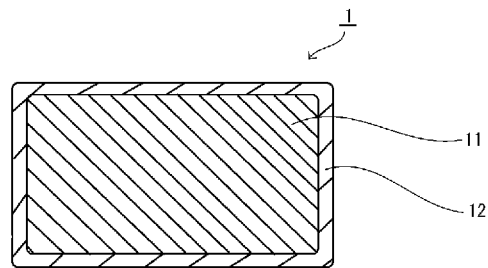
FIG. 1 is a schematic sectional view showing one embodiment of the insulated wire of the present invention.

The insulated wire 1 of the present invention has an insulating film 12 containing a polyimide resin having a specific structure described later on the periphery of the conductor 11 and in contact with this conductor, as shown in FIG. 1. In the present specification, when referred to simply as "insulating film", or "insulating film 12", these terms mean an insulating film (innermost insulating film) provided in contact with the conductor 11, unless otherwise indicated.

In the embodiment shown in FIG. 1, as to the conductor 11, its cross-sectional shape is rectangular (flat angular shape). A thickness of the insulating film 12 is set to a range of preferably 5 to 200 μm, more preferably 20 to 150 μm. The insulating film can have a multilayer structure as appropriate.

Conductor

As the conductor to be used in the present invention, use may be made of any usual one that is conventionally used as a conductor of insulated wires, and examples thereof include a metal conductor such as a copper wire and an aluminum wire.

FIG. 1 shows a conductor as having a rectangular cross section (flat angular shape). However, the cross sectional shape of the conductor is not particularly limited, and can be any desired shape such as square, round, or ellipse.

In view of suppressing partial discharge from a corner portion, the rectangular conductor has preferably such a shape that chamfered edges (curvature radius r) are provided at four corners, as shown in FIG. 1. The curvature radius r is preferably 0.6 mm or less, and more preferably in a range from 0.2 to 0.4 mm.

The size of the conductor is not particularly limited. In the case of the rectangular conductor, in the rectangular cross-sectional shape, the width (long side) thereof is preferably from 1.0 to 5.0 mm, and more preferably from 1.4 to 4.0 mm, and the thickness (short side) is preferably from 0.4 to 3.0 mm, and more preferably from 0.5 to 2.5 mm. The ratio of length (thickness:width) of the width (long side) and the thickness (short side) is preferably from 1:1 to 1:4. To the contrary, in the case of a conductor whose cross-sectional shape is round, the size is preferably 0.3 to 3.0 mm, and more preferably 0.4 to 2.7 mm in terms of a diameter.

Insulating Film

The insulating film 12 is a so-called enamel layer and contains a polyimide resin having a specific structure. The polyimide resin that constitutes the insulating film 12 is formed by reacting an acid anhydride (tetracarboxylic dianhydride) and a diamine to form a polyimide precursor, and subjecting the polyimide precursor to an intramolecular dehydration cyclization. Therefore, the polyimide resin has a unit composed of the acid anhydride constituting unit and the diamine constituting unit as a constituting unit (repeating unit). The polyimide resin constituting the insulating film 12 is preferably a thermosetting polyimide.

In the present invention, the polyimide resin constituting the insulating film contains the following constituting units (A) and (B) as a diamine-derived constituting unit.

(A) Constituting unit derived from 2,2-bis[4-(4-aminophenoxy)phenyl]propane (hereinafter, also referred to as "BAPP") (hereinafter, also referred to as "Constituting unit (A)")

(B) Constituting unit derived from 9,9-bis(4-aminophenyl)fluorene (hereinafter, also referred to as "FDA") (hereinafter, also referred to as "Constituting unit (B)")

In the present specification, "constituting unit derived from BAPP" means a constituting unit having a skeleton derived from BAPP, and "constituting unit derived from FDA" means a constituting unit having a skeleton derived from FDA. Further, in the present invention, note that the phrase "having a skeleton" means to include, in addition to a structure of the skeleton itself, a structure of the skeleton which further has a substituent to the extent that the effect of the present invention is not impaired. Examples of this substituent include a halogen atom and an alkyl group (preferably an alkyl group having 1 to 5 carbon atoms, and more preferably an alkyl group having 1 to 3 carbon atoms).

That is, the constituting unit (A) is a constituting unit having a skeleton represented by the following Formula (2), that is derived by imidization due to intramolecular dehydration cyclization of a polyamic acid obtained by a reaction of a compound having a skeleton represented by the following Formula (1) with a tetracarboxylic dianhydride. In the present invention, the symbol "*" presented in Formulas designates a linking site for being incorporated into the polyimide chain.

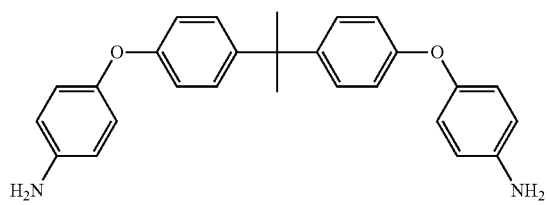

Formula (1)

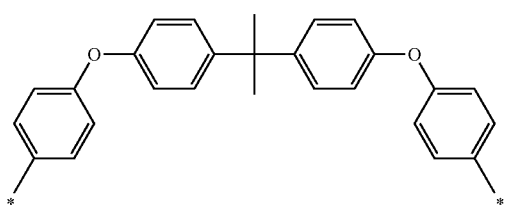

Formula (2)

Further, the constituting unit (B) is a constituting unit having a skeleton represented by the following Formula (4), that is derived by imidization due to intramolecular dehydration cyclization of a polyamic acid obtained by a reaction of a compound having a skeleton represented by the following Formula (3) with a tetracarboxylic dianhydride.

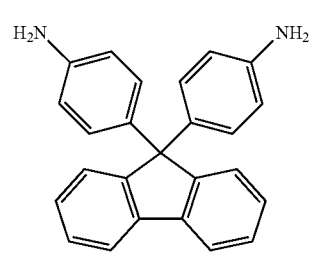

Formula (3)

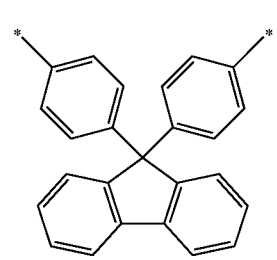

Formula (4)

The imide group concentration of the polyimide resin constituting the insulating film is 25.0% or less. From the viewpoint of reducing the relative permittivity, the imide group concentration is preferably 24.5% or less, and more preferably 24.0% or less.

The imide group concentration (%) is a value obtained by calculation according to the expression:

$$100 \times (\text{molecular weight of the imide group moiety}) / (\text{molecular weight of entire polymer}),$$

with respect to the polyimide resin after imidization of the polyimide precursor.

The imide group concentration of the polyimide resin can be determined by calculating an imide group concentration in the unit (repeating unit) from each of molecular weights of the acid anhydride constituting unit and the diamine constituting unit. For example, in a case of the polyimide resin constituted by the unit (pyromellitic anhydride (hereinafter, also referred to as "PMDA") constituting unit+ BAPP constituting unit), the imide group concentration is determined as follows.

Molecular weight of imide group moiety=70.03×2=140.06

Molecular weight of unit moiety=592.56

Imide group concentration=100×(140.06)/(592.56)=23.7%

Herein, the molecular weight of the imide group moiety (*—C(=O)—N(—*)—C(=O)—*, the symbol "*" is a linking site) is 70.03, and two (2) imide groups are included per one (1) unit of the polyimide resin. In the following formula, n designates a polymerization degree.

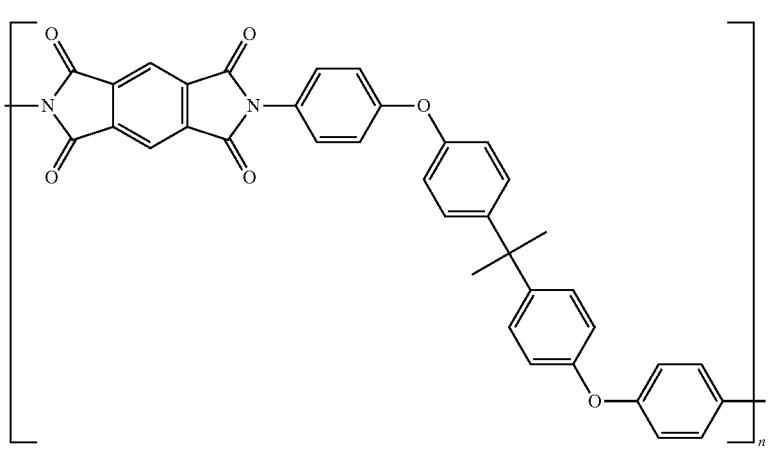

Formula (5)

From the viewpoint of the elongation of the insulating film, the ratio of the constituting unit (A) occupied in the diamine-derived constituting unit in the polyimide resin (the ratio of the total number of moles of the constituting unit (A) occupied in the total number of moles of the diamine-derived constituting unit, %) is preferably 60 mol % or more, more preferably 70 mol % or more, further preferably 80 mol % or more, further preferably 90 mol % or more, and particularly preferably 95 mol % or more.

The ratio of the constituting unit (B) occupied in the diamine-derived constituting unit in the polyimide resin (the ratio of the total number of moles of the constituting unit (B) occupied in the total number of moles of the diamine-derived constituting unit, %) is 1 to 40 mol %. From the viewpoint of the elongation of the insulating film, the ratio is preferably 30 mol % or less, more preferably 25 mol % or less, further preferably 20 mol % or less, further preferably 15 mol % or less, further preferably 10 mol % or less, and further preferably 7 mol % or less.

Further, from the viewpoint of the heat resistance of the insulating film, the ratio is preferably 3 mol % or more, and more preferably 5 mol % or more. The ratio may be 10 mol % or more, and may be 15 mol % or more.

The total of the ratio of the constituting unit (A) and the ratio of the constituting unit (B) occupied in the diamine-derived constituting unit in the polyimide resin (the ratio of the total number of moles of the constituting units (A) and (B) occupied in the total number of moles of the diamine-derived constituting unit, %) is preferably 70 mol % or more, more preferably 80 mol % or more, and further preferably 90 mol % or more. It is also preferable that all of the diamine-derived constituting unit constituting the polyimide are composed of the constituting unit (A) and the constituting unit (B).

With respect to the diamine-derived constituting units in the above-described polyimide resin, in a case of containing a diamine-derived constituting unit other than the constituting units (A) and (B), the structure of the diamine-derived constituting unit other than the constituting units (A) and (B) is not particularly limited and can be determined appropriately to the extent that the effects of the present invention are not impaired. The diamine-derived constituting unit other than the constituting units (A) and (B) is preferably a constituting unit derived from a diamine having an aromatic ring.

There is no particular limitation on the tetracarboxylic dianhydride-derived constituting unit constituting the polyimide resin as long as the polyimide resin satisfies the technical matters to define the present invention. Specific examples thereof include a constituting unit derived from 4,4'-oxydiphthalic anhydride, a constituting unit derived from pyromellitic anhydride, and a constituting unit derived from 3,3',4,4'-biphenyltetracarboxylic dianhydride.

The polyimide resin preferably contains at least one kind of the following constituting units (C) and (D) as a tetracarboxylic dianhydride-derived constituting unit.
(C) Constituting unit derived from pyromellitic anhydride (pyromellitic dianhydride) (hereinafter, also referred to as "Constituting unit (C)")
(D) Constituting unit derived from 3,3',4,4'-biphenyltetracarboxylic dianhydride (hereinafter, also referred to as "BPDA") (hereinafter, also referred to as "Constituting unit (D)")

In the present specification, "constituting unit derived from PMDA" means a constituting unit having a skeleton derived from PMDA, and "constituting unit derived from BPDA" means a constituting unit having a skeleton derived from BPDA.

That is, the constituting unit (C) is a constituting unit forming an imide structure having a skeleton represented by the following Formula (7), that is derived by imidization due to intramolecular dehydration cyclization of a polyamic acid obtained by a reaction of a compound having a skeleton represented by the following Formula (6) with a diamine compound.

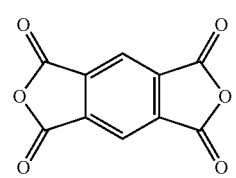

Formula (6)

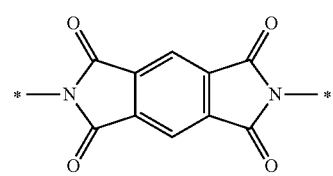

Formula (7)

In the present invention, the constituting unit (D) is a constituting unit forming an imide structure having a skeleton represented by the following Formula (9), that is derived by imidization due to intramolecular dehydration cyclization of a polyamic acid obtained by a reaction of a compound having a skeleton represented by the following Formula (8) with a diamine compound.

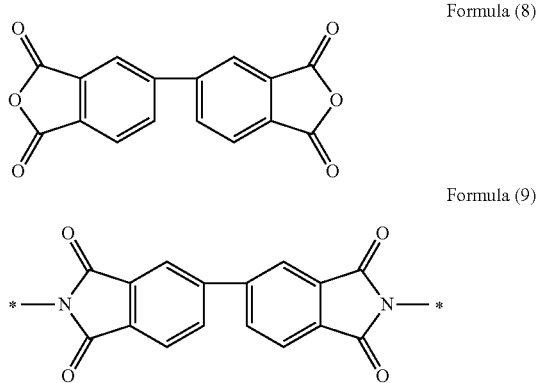

The total of the ratio of the constituting unit (C) and the ratio of the constituting unit (D) occupied in the tetracarboxylic dianhydride-derived constituting unit in the polyimide resin (the ratio of the total number of moles of the constituting units (C) and (D) occupied in the total number of moles of the tetracarboxylic dianhydride-derived constituting unit, %) is preferably 50 mol % or more, more preferably 70 mol % or more, further preferably 80 mol % or more, and further preferably 90 mol % or more. It is also preferable that all of the tetracarboxylic dianhydride-derived constituting unit constituting the polyimide are composed of the constituting unit (C) and/or the constituting unit (D).

The polyimide resin preferably contains the constituting unit (C). The ratio of the constituting unit (C) occupied in the tetracarboxylic dianhydride-derived constituting unit in the polyimide resin (the ratio of the total number of moles of the constituting unit (C) occupied in the total number of moles of the tetracarboxylic dianhydride-derived constituting unit) is preferably 20 mol % or more, more preferably 30 mol % or more, further preferably 40 mol % or more, further preferably 60 mol % or more, further preferably 80 mol % or more, and further preferably 90 mol % or more. It is also preferable that all of the tetracarboxylic dianhydride-derived constituting unit constituting the polyimide are composed of the constituting unit (C).

In the insulated wire of the present invention, the polyimide resin is contained in the insulating film in an amount of preferably 50 mass % or more, more preferably 70 mass % or more, and further preferably 80 mass % or more.

In the above-described insulating film, various kinds of additives can be contained. Examples of such an additive include a cell nucleating agent, an antioxidant, an antistatic agent, an ultraviolet inhibitor, a light stabilizer, a fluorescent brightening agent, a pigment, a dye, a compatibilizing agent, a lubricating agent, a reinforcing agent, a flame retardant, a crosslinking agent, a crosslinking aid, a plasticizer, a thickener, a thinning agent, an elastomer, and the like. These additives may be derived from the polyimide resin, or may be added separately.

Method of Producing Insulated Wire

In the method of producing the insulated wire of the present invention, an insulating film can be formed by coating, directly on the periphery of a conductor, a varnish containing both a polyamic acid that is a precursor of the above-described polyimide resin and an organic solvent dissolving the polyamic acid, and then subjecting the polyamic acid to a dehydration cyclization by baking. Around the insulating film produced, one or two or more insulating films having a different constituent material from the insulating film may be provided. By this baking, the solvent in the varnish is volatilized and removed. Examples of the organic solvent include: amide-based solvents, such as N-methyl-2-pyrrolidone (NMP), N,N-dimethylacetamide (DMAC), and N,N-dimethylformamide (DMF); urea-based solvents, such as N,N-dimethylethyleneurea, N,N-dimethylpropyleneurea, and tetramethylurea; lactone-based solvents, such as γ-butyrolactone and γ-caprolactone; carbonate-based solvents, such as propylene carbonate; ketone-based solvents, such as methyl ethyl ketone, methyl isobutyl ketone, and cyclohexanone; ester-based solvents, such as ethyl acetate, n-butyl acetate, butyl cellosolve acetate, butyl carbitol acetate, ethyl cellosolve acetate, and ethyl carbitol acetate; glyme-based solvents, such as diglyme, triglyme, and tetraglyme; hydrocarbon-based solvents, such as toluene, xylene, and cyclohexane; phenol-based solvents, such as cresol, phenol, and halogenated phenol; sulfone-based solvents, such as sulfolane; and dimethylsulfoxide (DMSO).

The insulating film may be constituted by one layer, or may be multi-structured by repeating coating and baking multiple times. Further, around the insulating film containing the above-described polyimide resin, that is provided in contact with the outer periphery of the conductor, other insulating film that has a different constituent material from the insulating film may be formed. Specifically, the insulated wire of the present invention also preferably has a structure with two or more insulating films, which are different from each other in terms of constituent material. In this case, the insulating film composed of a constituent material different from the polyimide resin preferably contains at least one kind of a polyamideimide resin, a polyimide resin and a polyester imide resin.

Coating of the varnish onto the periphery of the conductor can be carried out in the usual manner. Examples thereof include a method of using a varnish-coating die having a similar shape to the cross-sectional shape of the conductor, and when the cross-sectional shape of the conductor is rectangular, a method of using a die that is called as "Universal die" formed in the grid shape.

The baking after the insulating coating is coated can be performed by an ordinary method. For example, the baking can be performed in a baking furnace. The baking conditions in this case depend on the shape and the like of the furnace to be used and cannot be unambiguously decided. In the case where the furnace is a natural convection vertical furnace of about 10 m, for example, the conditions are at the furnace temperature of 400 to 650° C. and the transit time of from 10 to 90 sec.

Coil, and Electrical or Electronic Equipment

The insulated wire of the present invention is applicable to a field which requires electrical properties (resistance to voltage) and heat resistance, such as various kinds of electrical or electronic equipment, as a coil. For example, the insulated wire of the present invention is used for a motor, a transformer and the like, which can compose a high-performance electrical or electronic equipment. In particular, the insulated wire is preferably used as a winding wire for a driving motor of hybrid vehicle (HV) and electrical vehicle (EV). As descried above, according to the present invention, it is possible to provide an electrical or electronic equipment using the insulated wire of the present invention as a coil, in particular a driving motor of HV and EV.

The coil of the present invention is not particularly limited, as long as it has a form suitable for any of various kinds of electrical or electronic equipment, and examples thereof include: items formed by a coil processing of the insulated wire of the present invention, and items formed by electrically connecting prescribed parts after bending the insulated wire of the present invention.

The coils formed by coil processing of the insulated wire of the present invention are not particularly limited, and examples thereof include a roll formed by spirally winding around a long insulated wire. In these coils, the number of winding wires or the like of the insulated wire is not particularly limited. Ordinarily, in winding around the insulated wire, use may be made of an iron core, or the like.

Example of the coils formed by electrically connecting prescribed parts after bending the insulated wire of the present invention include coils used in stators for rotating electrical machines or the like. Examples of these coils include a coil 33 (see FIG. 2) prepared by, as shown in FIG. 3, cutting the insulated wire of the present invention in a prescribed length, and then bending them in the U-shaped form or the like, thereby preparing a plurality of wire segments 34, and then alternately connecting two open ends (terminals) 34a in the U-shaped form or the like of each wire segment 34.

Figure 2:
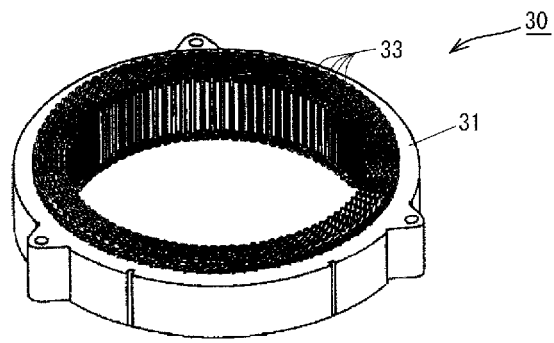
FIG. 2 is a schematic perspective view showing a preferable embodiment of the stator to be used in the electrical or electronic equipment of the present invention.
Figure 3:
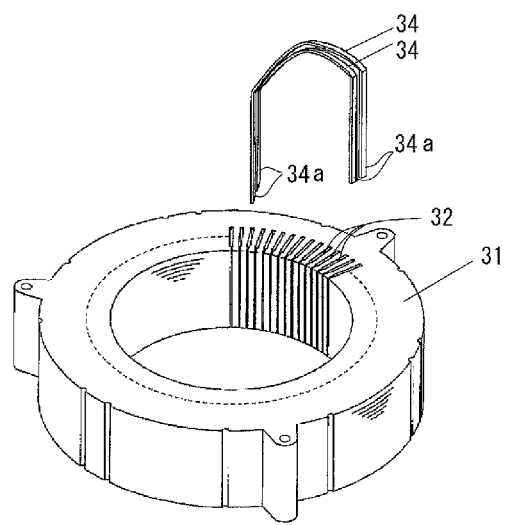
FIG. 3 is a schematic exploded perspective view showing a preferable embodiment of the stator to be used in the electrical or electronic equipment of the present invention.

The electrical or electronic equipment formed by using this coil is not particularly limited, and examples of one preferable embodiment of such electrical or electronic equipment include a transformer, and a rotating electric machine equipped with a stator 30 shown in FIG. 2 (in particular, driving motors of HV and EV). This rotating electric machine can be made in the same constitution as the conventional one, except for equipment of the stator 30.

The stator 30 can be made in the same constitution as the conventional one, except that its wire segment 34 is formed by the insulated wire of the present invention. Specifically, the stator 30 has a stator core 31, and a coil 33 in which, as shown in such as FIG. 2, the wire segments 34 formed of the insulated wire of the present invention are incorporated in a slot 32 of the stator core 31 and open ends 34a are electrically connected. This coil 33 is in the fixed state such that adjacent fusing layers, or the fusing layer and the slot 32 are firmly fixed. Herein, the wire segment 34 may be incorporated in the slot 32 with one segment. However, it is preferable that as shown in FIG. 3, two segments are incorporated in pairs. In this stator 30, the coil 33 formed by alternately connecting the open ends 34a that are two ends of the wire segments 34 which have been bent as described above, is incorporated in the slot 32 of the stator core 31. In this time, the wire segment 34 may be incorporated in the slot 32 After connecting the open ends 34a thereof. Alternatively, after incorporating the wire segment 34 in the slot 32, the open ends 34a of the wire segment 34 may be bent, thereby to connect them.

The present invention will be described in more detail based on examples given below, but the invention is not meant to be limited by these.

EXAMPLES

Production Example Production of Insulated Wire

Conductor

A copper wire with a circular cross section (outer diameter of the cross section: 1 mm) was used as the conductor.

Polyimide Resin Coating (Insulating Coating)

The diamine shown in the following Table was dissolved in NMP. The acid anhydride shown in the following Table was added to this solution, and the resultant was stirred under a nitrogen atmosphere to obtain a polyimide resin coating.

Insulated Wire

A coating film was formed by setting a dice so that the dried film thickness is 5 μm, and then coating the polyimide resin coating on the outer periphery of the above-described conductor.

Baking was performed at 520° C. for a transit time of 10 to 20 seconds in a hot-air circulating vertical furnace having a height of about 10 m. This coating and baking was repeated 6 times to obtain an insulated wire with an insulating film thickness of 30 μm.

Test Example 1 Relative Permittivity

As for the relative permittivity, at the beginning, an electrostatic capacity of each insulated wire produced was measured, and a relative permittivity obtained from the electrostatic capacity and the thickness of the insulating film was used as the measured value. For the measurement of the electrostatic capacity, an LCR HiTESTER (manufactured by HIOKI E.E. CORPORATION, Model IM 3536) was used. For the measurement conditions, the measurement temperature was set to 150° C., and the measurement frequency was set to 1 kHz.

The relative permittivity can be determined using the following Equation (10).

$$\text{Relative permittivity: } \varepsilon r^* = Cp \cdot \text{Log}(b/a)/(2\pi\varepsilon 0) \quad \text{Equation (10)}$$

In Equation (10), $\varepsilon r^*$ is the relative permittivity of the enamel resin insulating laminate, Cp is the electrostatic capacity per unit length [pF/m], a is an outer diameter of the conductor, b is an outer diameter of the insulated wire, and $\varepsilon_0$ is the permittivity of vacuum ($8.855 \times 10^{-12}$ [F/m]).

The case where the relative permittivity was 2.8 or less was rated as "⊚", the case where the relative permittivity was more than 2.8 and 3.2 or less was rated as "○", and the case where the relative permittivity was more than 3.2 was rated as "x".

Test Example 2 Adhesion Strength (180° Peel Strength)

Using a jig by which a cutter was connected to a micrometer, an incision having the width of 1 mm was made at the length of 50 mm or more in the longitudinal direction, with respect to the above-produced insulated wires. Note that the incision was made so as to reach the conductor. The 180° peeling test was conducted in the longitudinal direction along the incision at the rate of 1 mm/min using a tensile tester (device name: "AUTOGRAPH AG-X", manufactured by SHIMADZU CORPORATION). In the 180° peel strength up to 50 mm after 20 cm peeling, the case where the peel strength is 70 gf/mm or more was rated as "⊚", the case where the peel strength is 50 gf/mm or more and less than 70 gf/mm was rated as "○", the case where the peel strength is 30 gf/mm or more and less than 50 gf/mm was rated as "Δ", and the case where the peel strength is less than 30 gf/mm was rated as "x".

Note that if the insulating film has cracks, adhesion strength cannot be measured and in this case, the adhesion strength test was not conducted.

Test Example 3 Flexibility

The insulated wire produced as described above was elongated in conformity to JIS C 3216:2011. The insulated wire elongated in this way was wound around a winding stick having the same diameter as the conductor of the insulated wire in conformity to JIS C 3216:2011 to examine a presence or an absence of breakage and cracks (presence or absence of defects) of the insulating film by an optical microscopic observation. The flexibility was evaluated based on the following evaluation criteria.

Evaluation Criteria

○: Even when the insulated wire was elongated by 30% thereof (elongation by 1.3 times), any defects were not developed in the insulating film.

Δ: Although defects were developed in the insulating film, when the insulated wire was elongated by 30% thereof, any defects were not developed in the insulating film when the insulated wire was elongated by 20% thereof.

x: Defects were developed in the insulating film when the insulated wire was elongated by 20% thereof.

TABLE 1

| Composition (mol %) | | Examples | | | | | |
|---|---|---|---|---|---|---|---|
| | | 1 | 2 | 3 | 4 | 5 | 6 |
| Acid anhydride | pyromellitic anhydride (PMDA) | 100 | 100 | 50 | 100 | | |
| | 3,3',4,4'-biphenyltetracarboxylic dianhydride (BPDA) | | | 50 | | | |
| | 4,4'-oxydiphthalic anhydride (ODPA) | | | | | 100 | 100 |
| Diamine | 2,2-bis[4-(4-aminophenoxy) phenyl]propane (BAPP) | 95 | 90 | 80 | 70 | 90 | 60 |
| | 9,9-bis(4-aminophenyl)fluorene (FDA) | 5 | 10 | 20 | 30 | 10 | 40 |
| | 4,4'-diaminodiphenyl ether (ODA) | | | | | | |
| | 1,4-bis(4-aminophenoxy)benzene (TPE-Q) | | | | | | |
| Imide group concentration (%) | | 23.8 | 23.9 | 22.7 | 24.4 | 20.7 | 21.2 |
| Relative permittivity (150° C.) | | ◎ | ◎ | ○ | ○ | ○ | ○ |
| Adhesion strength (gf/mm) | | ◎ | ◎ | ◎ | ○ | Δ | Δ |
| Flexibility | | ○ | ○ | ○ | ○ | ○ | Δ |

| Composition (mol %) | | Comparative Examples | | | | |
|---|---|---|---|---|---|---|
| | | 1 | 2 | 3 | 4 | 5 |
| Acid anhydride | pyromellitic anhydride (PMDA) | 100 | 100 | | 100 | 100 |
| | 3,3',4,4'-biphenyltetracarboxylic dianhydride (BPDA) | | | | | |
| | 4,4'-oxydiphthalic anhydride (ODPA) | | | 100 | | |
| Diamine | 2,2-bis[4-(4-aminophenoxy) phenyl]propane (BAPP) | 100 | | | 50 | 40 |
| | 9,9-bis(4-aminophenyl)fluorene (FDA) | | | | 40 | 50 | 60 |
| | 4,4'-diaminodiphenyl ether (ODA) | | 100 | | | |
| | 1,4-bis(4-aminophenoxy)benzene (TPE-Q) | | | 60 | | |
| Imide group concentration (%) | | 23.7 | 36.7 | 23.8 | 24.9 | 25.2 |
| Relative permittivity (150° C.) | | ○ | ○ | X | ○ | ○ |
| Adhesion strength (gf/mm) | | X | X | X | — | — |
| Flexibility | | ○ | ○ | Δ | X | X |

Note that: the symbol "—" means that the adhesion strength test was not conducted due to the presence of cracks on the insulating film.

As shown in Table 1, in the insulated wire having an insulating film formed without blending 9,9-bis(4-aminophenyl)fluorene as the diamine, the result was inferior in the adhesion strength between the insulating film and the conductor (Comparative Example 1). Further, in the insulated wires having an insulating film formed without blending 2,2-bis[4-(4-aminophenoxy)phenyl]propane as the diamine, the results were also inferior in the adhesion strength (Comparative Examples 2 and 3). Further, even in the case where the insulating film was formed by blending both 2,2-bis[4-(4-aminophenoxy)phenyl]propane and 9,9-bis(4-aminophenyl)fluorene, cracks occurred in the film formed unless the blending ratio defined by the present invention was met (Comparative Examples 4 and 5).

In contrast, in the insulated wires that satisfy all requirements of the present invention, the adhesion strength between the insulating film and the conductor was further increased while realizing sufficiently low relative permissibility, and also these insulated wires were excellent in the flexibility (Examples 1 to 6).

Test Example 4 Adhesion Strength after Thermal Treatment

The adhesion strength between each of conductors of the insulated wires of Examples 1 to 6 each of which had been put in a thermostat set to 200° C. for 500 hours and then was taken out from the thermostat and the insulating film was measured in the same manner as the above-described Test Example 2.

As a result, the insulated wires of Examples 1 to 6 satisfying the requirements of the present invention was less prone to thermal deterioration even when exposed to a high temperature of 200° C. for 500 hours, and was less prone to reduction in adhesion to the conductor.

Having described our invention as related to the present embodiments, it is our intention that the invention not be limited by any of the details of the description, unless otherwise specified, but rather be construed broadly within its spirit and scope as set out in the accompanying claims.

REFERENCE SIGNS LIST

1 Insulated wire
11 Conductor
12 Insulating film (single layer, multilayer)
30 Stator
31 Stator core
32 Slot
33 Coil
34 Wire segment
34a Open end

The invention claimed is:

1. An insulated wire, comprising:
   a conductor; and
   an insulating film provided in direct contact with the conductor; wherein the insulating film comprises a polyimide resin, and the polyimide resin contains a constituting unit (A) derived from 2,2-bis[4-(4-aminophenoxy)phenyl]propane and a constituting unit (B) derived from 9,9-bis(4-aminophenyl)fluorene as a diamine-derived constituting unit;
   wherein the polyimide resin has an imide group concentration of 25.0% or less;
   wherein the polyimide comprises at least one kind of the following (C) and (D) as a tetracarboxylic dianhydride-derived constituting unit:
   (C) a constituting unit derived from pyromellitic anhydride; and
   (D) a constituting unit derived from 3,3',4,4'-biphenyltetracarboxylic dianhydride, and wherein the ratio of the constituting unit (B) occupied in the diamine-derived constituting unit in the polyimide resin is 3 mol % or more and 15 mol % or less.

2. The insulated wire according to claim 1, comprising at least an additional insulating film, wherein
   the additional insulating film is different from the insulating film in direct contact with the conductor in terms of constituent material.

3. The insulated wire according to claim 2, wherein
   the additional insulating film comprises at least one kind of a polyamideimide resin, a polyimide resin, or a polyesterimide resin.

4. The insulated wire according to claim 1, wherein the imide group concentration of the polyimide resin is 24.0% or less.

5. A coil, comprising the insulated wire according to claim 1.

6. An electrical or electronic equipment, comprising the coil according to claim 5.

7. The electrical or electronic equipment according to claim 6, which is a transformer.

* * * * *